United States Patent Office 3,452,134
Patented June 24, 1969

3,452,134
DERIVATIVES OF 2,4,6-TRIIODO-3-HYDROXY-BENZENE AS X-RAY OPACIFIERS
Guy Tilly, Drancy, France, assignor to Laboratoires Andre Guerbet, Saint Ouen, France, a French body corporate
No Drawing. Filed July 19, 1966, Ser. No. 566,233
Claims priority, application France, Aug. 6, 1965, 27,478
Int. Cl. A61k *27/08;* C07d *87/32;* C07c *103/26*
U.S. Cl. 424—5                7 Claims

ABSTRACT OF THE DISCLOSURE

These derivatives of 2,4,6-triiodo-3-hydroxy-benzene of the formula

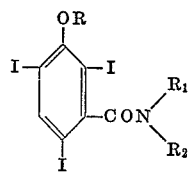

wherein R is hydrogen or a

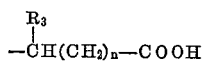

group, $R_3$ being hydrogen, alkyl or phenyl and $n$ being an integer from 0 to 4, $R_1$ and $R_2$ are hydrogen, alkyl or hydroxyalkyl or, together with the nitrogen atom, form a piperidino or morpholino group, are useful in cholecystography and as choleretics.

The present invention has for its object novel derivatives of 2,4,6-triiodo-3-hydroxy benzene consisting of compounds of the formula:

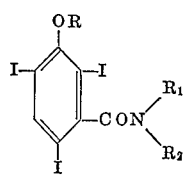

(I)

wherein R is hydrogen or a

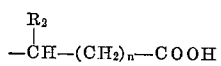

$R_3$ being hydrogen, alkyl having 1–6 carbon atoms or phenyl and $n$ is an integer from 0 to 4 inclusive, and $R_1$ and $R_2$ are each hydrogen or an alkyl or hydroxyalkyl or, together with the nitrogen atom to which they are attached, form a piperidino or morpholino group, and the alkali metal salts of these compounds.

Said salts are those resulting from the salification of the phenol or carboxyl group attached at 3-position to the benzene nucleus.

Compounds (I) and the salts thereof are especially suitable for use as opacifiers in cholecystography and as choleretics.

It has been indeed discovered that compounds (I) and their salts, after oral administration, concentrate in the gall bladder and thus permit the radiological examination of the gall bladder, generally in an outstanding manner; they have also a marked choleretic activity.

The invention has also for its object a process for the preparation of compounds (I) and the salts thereof.

According to this process, a m-hydroxy-N-benzamide of formula:

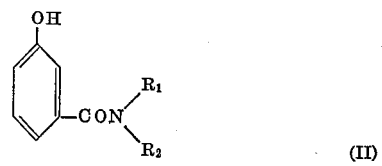

(II)

wherein $R_1$ and $R_2$ are as previously defined, is iodinated, thereby obtaining a compound (I) wherein R is hydrogen then, when R is other than hydrogen, an alkali metal salt of the resulting compound is reached with an halogenated derivative of formula

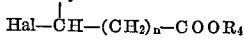

wherein $R_3$ and $n$ are as previously defined, Hal is halogen and $R_4$ is hydrogen or an alkyl group, the resulting compound is saponified when $R_4$ is an alkyl group, thereby obtaining a compound (I) wherein R is a

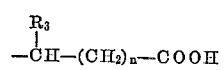

group and, if desired, the compound is salified with a base.

The synthesis of m-hydroxy N-benzamides was described by Couturier P.L., Ann. Chim. (II), 10, (1938), 559.

Iodination thereof is advantageously effected in aqueous acidic solution with iodine chloride.

The iodination reaction occurs at ambient temperature, however, it is accelerated by moderate heating, e.g. at a temperature within the range 40–70° C.

The condensation of the iodine derivative of the m-hydroxy N-benzamide, previously converted into an alkali metal salt, with the halogenated derivative of formula

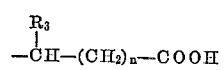

is readily effected by heating the reagents in solution in an organic solvent.

The saponification of the resulting compound, when $R_4$ is an alkyl group, is effected according to the usual techniques. This is also the case with respect to the eventual salification of the resulting compounds (I).

The following examples are given for the purpose of illustrating the preparation of compounds (I):

EXAMPLE 1

2,4,6-triiodo-3-hydroxy-N-methyl benzamide
($R=R_1=H$, $R_2=CH_3$)

To a solution of 21.4 g. of 3-hydroxy N-methyl benzamide in 628 ml. of normal hydrochloric acid solution are slowly added, dropwise and under vigorous stirring, at 60° C., 62 ml. of an iodine chloride solution (containing 70% w./v. of iodine).

Heating and stirring are continued for a further 72 hours following completion of the addition.

The light ochre solid is suction filtered, washed with dilute hydrochloric acid, then with a sodium bisulfite solution and finally with water. M.P. 231° C., weight 21.2 g., yield 88%.

The readily produced corresponding sodium phenoxide is recrystallized from water prior to analysis:

Iodine content.—Theory 70.3%. Found 70.0%.

EXAMPLE 2

2,4,6-triiodo-3-hydroxy N-di(1-hydroxy-2-ethyl)benzamide ($R=H$, $R_1=R_2=-CH_2-CH_2OH$)

The 3-hydroxy-N-di(1-hydroxy-2-ethyl) benzamide is prepared by reacting a solution containing 27 g. of diethanolamine in 80 ml. of water with 19.8 g. of meta-acetoxybenzoic acid chloride.

The acid chloride is slowly added at 0° C., with stirring, to the amino alcohol solution.

Deacetylation is effected in alkaline medium, in the cold over 2 hours, by addition of 52 ml. of 2 N sodium hydroxide. The solution is then acidified with a normal hydrochloric acid solution to a pH of 1.

The phenol is not isolated and iodination is effected directly on the preceding solution by gradual addition thereto of a normal hydrochloric acid solution to a total volume of the solution of 600 ml.

60 ml. of iodine chloride solution (70% w./v. of iodine) are then added dropwise.

After stirring 48 hours at 40° C., the expected phenol is suction filtered, washed with a sodium bisulfite solution and then with water. M.P. 155° C., weight 50.5 g., yield 84%.

Iodine content.—Theory 63.2%. Found 62.9%.

EXAMPLE 3

2,4,6-triiodo-3-hydroxy-N-morpholinobenzamide

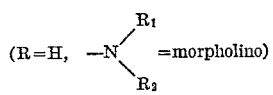

($R=H$, $-N\begin{smallmatrix}R_1\\R_2\end{smallmatrix}$ = morpholino)

20.7 g. of 3-hydroxy-N-morpholino benzamide are dissolved in 575 ml. of normal hydrochloric acid solution at a temperature of about 80° C. This temperature is decreased to 70° C. for the dropwise addition of 57.5 ml. of iodine chloride (70% w./v. of iodine).

After stirring 48 hours at 70° C., a white product is suction filtered, washed with dilute hydrochloric acid and then with water. It is recrystallized from methanol. M.P. 218° C., weight 42 g., yield 72%.

Iodine content.—Theory 65.2%. Found 64.8%.

In the following table are tabulated, for a number of compounds (I) wherein $R=H$, the melting point, the yield resulting from the preparation thereof according to the procedure described in the above examples, and the opacifying properties thereof:

| $\begin{smallmatrix}R_1\\N\\R_2\end{smallmatrix}$ | Melting point, °C. | Yield, Percent | Gall bladder opacification (in cats) |
|---|---|---|---|
| $N\begin{smallmatrix}H\\CH_3\end{smallmatrix}$ | 231 | 88 | + |
| $N\begin{smallmatrix}H\\C_2H_5\end{smallmatrix}$ | 222 | 60 | + |
| $N\begin{smallmatrix}H\\CH_2-CH_2-CH_2-CH_3\end{smallmatrix}$ | 158 | 77 | +++ |
| $N\begin{smallmatrix}H\\CH_2-CH(CH_3)_2\end{smallmatrix}$ | 188 | 81 | ++ |
| $N\begin{smallmatrix}H\\CH_2-CH_2OH\end{smallmatrix}$ | 160 | 71 | + |
| $N\begin{smallmatrix}CH_3\\CH_3\end{smallmatrix}$ | 193 | 71 | +++ |
| $N\begin{smallmatrix}C_2H_5\\C_2H_5\end{smallmatrix}$ | 100–110 | 96 | ++ |
| $N\begin{smallmatrix}CH_2-CH_2OH\\CH_2-CH_2OH\end{smallmatrix}$ | 155 | 84 | ++ |
| Morpholino | 218 | 90 | +++ |
| Piperidino | 212 | 65 | +++ |

The symbols (+), (++), (+++) indicate the intensity of the opacification of the gall bladder in cats for a dosage of product corresponding to an iodine content of 0.1 g./kg.: + barely visible, ++ faintly visible, +++ fair.

($R=-\overset{C_2H_5}{\underset{|}{C}H}-COOH$, $R_1=H$, $R_2=CH_3$)

EXAMPLE 4

(2,4,6-triiodo-3-N-methylcarbamyl)-phenoxy-α-butyric acid 52.9 g. of 2,4,6-triiodo-3-hydroxy-N-methylbenzamide are dissolved in 50 ml. of methanol in which 2.7 g. of sodium were previously dissolved.

To this solution are added 100 ml. of methanol and, at 60° C., are added 19.2 ml. of ethyl α-bromobutyrate.

The whole is heated under good stirring for 48 hrs. at 60° C.

After concentrating to dryness, the water-insoluble oil is washed with hot water and is then saponified with 160 ml. of 3 N sodium hydroxide by heating 4 hours under reflux.

The expected acid is precipitated from the clear solution obtained with a normal hydrochloric acid solution. M.P. 150° C., weight 44 g., yield 72%.

Iodine content.—Theory 62%. Found 61.5%.

EXAMPLE 5

(2,4,6-triiodo-3-N-methylcarbamyl)-phenoxy-γ-butyric acid ($R=(CH_2)_3COOH$, $R_1=H$, $R_2=CH_3$)

52.9 g. of the sodium derivative of 2,4,6-triiodo-3-hydroxy-N-methylbenzamide are dissolved at 60° C. in 120 ml. of methanol. To this solution are added 16.8 ml. of ethyl γ-chlorobutyrate.

After stirring for 4 days at 60° C. and on cooling, the ester crystallizes. It is suction filtered (M.P.=166° C.), and is then saponified.

The crude ester is dispersed in 48 ml. of 2 N sodium hydroxide and is then saponified by heating under reflux for ½ hr. The acid is then precipitated in hydrochloric medium. M.P. 196° C., weight 40 g., yield 65%.

Iodine content.—Theory 62%. Found 62.4%.

EXAMPLE 6

(2,4,6-triiodo-3-N-morpholino carbamyl)-phenoxy-α-butyric acid

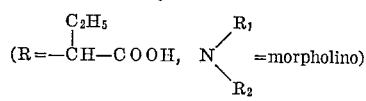

58.5 g. of 2,4,6-triiodo-3-hydroxy-N-morpholino benzamide are dissolved in 90 ml. of methanol in which 2.7 g. of sodium were previously dissolved. At 60° C., there are added 19 ml. of ethyl α-bromobutyrate. The mixture is heated under good stirring, at 60° C., for 72 hours. After evaporation of the solvent, the resulting gum is washed with hot water, and is then saponified with 60 ml. of 2 N sodium hydroxide by heating under reflux for 1 hour.

The acid is precipitated with a dilute hydrochloric acid solution. It is then recrystallized from methanol. M.P. 187° C., weight 61 g., yield 91%.

Iodine content.—Theory 56.7%. Found 57.1%.

EXAMPLE 7

(2,4,6-triiodo-3-N-morpholino carbamyl)-phenoxy-γ-butyric acid

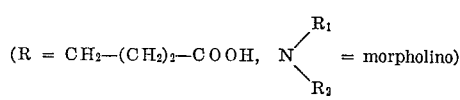

(1) Sodium 2,4,6 - triiodo-3-N-morpholino carbamyl phenoxide.— 73 g. of 2,4,6 - triiodo-3-hydroxy-N-morpholino benzamide are added portionwise to 34.4 ml of a 4 N sodium hydroxide solution, under vigorous stirring. After cooling, the desired sodium phenoxide is suction filtered and dried at 70° C. Weight 68 g., yield 90%.

(2) (2,4,6-triiodo-3-N-morpholino carbamyl)-phenoxy-γ-butyric acid.—60.8 g. of the sodium 2,4,6- triiodo-3-N-morpholino carbamyl phenoxide are dissolved in 43 ml. of anhydrous dimethylformamide at 60–70° C. To the solution are added 2 g. of anhydrous sodium carbonate followed by the dropwise addition of 18.5 ml. of ethyl γ-chlorobutyrate, with stirring. The solution is heated to 110° C., with continued stirring, during 24 hours.

After cooling, 150 ml. of water are added thereto.

The decanted gum is washed twice with 100 ml. of water and is then saponified by heating under reflux in a 2 N aqueous sodium hydroxide solution, for about 2 hours, until dissolved.

The desired acid is precipitated with a dilute hydrochloric acid solution and is then recrystallized from an alcohol-dioxan (50:50) mixture. M.P. 170° C., weight 57 g., yield 85%.

Iodine content.—Theory 56.78%. Found 56.4%.

In the following table are given the melting points and the opacifying properties of a number of compounds (I) wherein:

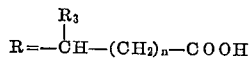

| $N\begin{matrix}R_1\\R_2\end{matrix}$ | $R_3=C_2H_5$<br>n=0 | $R_3=C_6H_5$<br>n=0 | $R_3=H$<br>n=2 |
|---|---|---|---|
| $N\begin{matrix}H\\CH_3\end{matrix}$ | M.P.=150° C.+ | M.P.=250° C.+ | M.P.=196° C.++ |
| $N\begin{matrix}H\\C_2H_5\end{matrix}$ | M.P.=130° C.++ | M.P.=215° C.+ | M.P.=208° C.+ |
| $N\begin{matrix}CH_3\\CH_3\end{matrix}$ | M.P.=80° C.++ | M.P.=240° C.++ |  |
| Morpholino | M.P.=186° C.+++ | M.P.=218° C.+ | M.P.=170° C.++++ |

The symbols (+), (++), (+++) and (++++) indicate the intensity of the opacification of the gall bladder in cats for a dosage of product corresponding to an iodine content of 0.1 g./kg.: + barely visible gall bladder, +++ fairly visible gall bladder, ++ faintly visible gall bladder ++++ highly visible gall bladder.

It goes without saying that the low opacification properties mentioned with respect to some of the compounds (I) in both the above tables may be improved by increasing the dosage of compound (I) administered, inasmuch as compounds (I) have, as a whole, little toxicity.

In the following table are reported, for some preferred compounds (I), the opacifying properties in cat for a dosage of product corresponding to an iodine content of 0.1 g./kg., together with the $LD_{50}$ (expressed as weight of product) of the sodium salts of such compounds, both orally and by the intravenous route:

| Gall bladder opacification (in cat) | Compound (I) | $LD_{50}$ per os, g./kg. | $LD_{50}$ (I.V.) g./kg. |
|---|---|---|---|
| +++ | 2,4,6-triiodo-3-hydroxy-N-dimethyl benzamide. | 3 | 0.56 |
| +++ | 2,4,6-triiodo-3-hydroxy-N-morpholino benzamide. | 4.6 | 0.68 |
| ++ | 2,4,6-triiodo-3-N-dimethyl-carbamyl-phenoxy-α-butyric acid. | 4.8 | 1.3 |
| +++ | (2,4,6-triiodo-3-N-morpholino carbamyl)-phenoxy-α-butyric acid. | 6 | 1.8 |
| ++++ | (2,4,6-triiodo-3-N-morpholino carbamyl)-phenoxy-α-caproic acid. | 3.5 | 0.7 |
| ++++ | (2,4,6-triiodo-3-N-morpholino carbamyl)-phenoxy-γ-butyric acid. | 5.5 | 0.6 |

NOTE.—The symbols (++), (+++), (++++) indicate the intensity of the opacification of the gall bladder in cat as previously set forth.

Studies of bile excretion in rat, by choledoch fistula have shown, in addition, that compounds (I) were strongly choleretic. For example, normal choleresis is multiplied by a factor of 2.5 with (2,4,6-triiodo-3-N-morpholino carbamyl)-phenoxy-α-butyric acid after intraduodenal injection of 0.17 g./kg. of the product (corresponding to an iodine content of 0.1 g./kg.)

Thus, compounds (I) and the salts thereof are useful in human clinics as opacifiers of the gall bladder for X-ray purposes and as choleretics.

In such applications, compounds (I) and the salts thereof are administered advantageously by the oral route, in tablet, capsule, syrup and granule form, the active principle being associated with the usual vehicles and excepients suitable for such formulations. The following examples are given for the purpose of illustrating some of these formulations.

EXAMPLE A

Granules with 50% of sugar were prepared from 2,4,6-triiodo-3-hydroxy-N-morpholino benzamide.

4.5 g. of product are sufficient for markedly opacifying the gall bladder.

EXAMPLE B

Granules with 50% of sugar were prepared from (2,4,6-triiodo - 3 - N-morpholino carbamyl)-phenoxy-γ-butyric acid.

4.5 g. of the acid are sufficient to provide marked opacification of the gall bladder.

EXAMPLE C

The sodium salt of (2,4,6-triiodo-3-N-morpholino-carbamyl)-phenoxy-γ-butyric acid was filled into gelatin capsules.

Each capsule contains 500 mg. of sodium salt.

4.5 g. of sodium salt are sufficient to provide marked opacification of the gall bladder.

Having now described my invention what I claim as new and desire to secure by Letters Patent is:

1. 2,4,6-triiodo-3-hydroxy-benzene derivative of the formula:

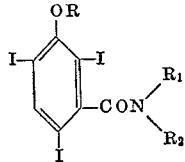

(I)

wherein R is a member selected from the group consisting of hydrogen and

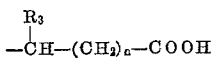

$R_3$ being a member selected from the group consisting of hydrogen, alkyl containing 1–6 carbon atoms and phenyl and $n$ being an integer from 0 to 4 inclusive, and $R_1$ and $R_2$ are each a member selected from the group consisting of hydrogen, alkyl and hydroxyalkyl containing 1–6 carbon atoms and $R_1$ and $R_2$, together with the nitrogen atom to which they are attached, form morpholino and piperidino groups, and the alkali metal salts of such compounds.

2. 2,4,6-triiodo-3-hydroxy-N-dimethyl benzamide and the alkali metal salts thereof.

3. 2,4,6 - triiodo-3-hydroxy-N-morpholino benzamide and the alkali metal salts thereof.

4. (2,4,6 - triiodo-3-N-dimethyl carbamyl) - phenoxy-α-butyric acid and the alkali metal salts thereof.

5. (2,4,6 - triiodo-3 - N - morpholino carbamyl)-phenoxy-α-butyric acid and the alkali metal salts thereof.

6. (2,4,6 - triiodo - 3 - N - morpholino carbamyl)-phenoxy-γ-butyric acid and the alkali metal salts thereof.

7. Composition suitable for use as opacifier in cholecystography and as choleretic, comprising a pharmacologically acceptable vehicle and a 2,4,6-triiodo-3-hydroxy benzene derivative selected from the compounds of the formula:

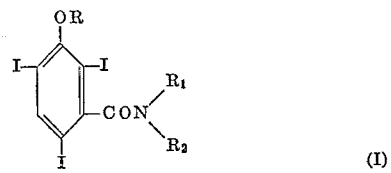

(I)

wherein R is a member selected from the group consisting of hydrogen and

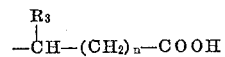

$R_3$ being a member selected from the group consisting of hydrogen, alkyl containing 1–6 carbon atoms and phenyl and $n$ being an integer from 0 to 4 inclusive, and $R_1$ and $R_2$ are each a member selected from the group consisting of hydrogen, alkyl and hydroxyalkyl containing 1–6 carbon atoms and $R_1$ and $R_2$, together with the nitrogen atom to which they are attached, form morpholino and piperidino groups, and the non toxic alkali metal salts of such compounds.

References Cited

UNITED STATES PATENTS

| | | | |
|---|---|---|---|
| 2,606,922 | 8/1952 | Papa et al. | 167—95 X |
| 2,711,424 | 6/1955 | Suter et al. | 167—95 X |
| 2,796,432 | 6/1957 | Redel et al. | 167—95 X |
| 2,931,830 | 4/1960 | Archer | 167—95 X |
| 3,226,431 | 12/1965 | Felder et al. | 167—95 X |

ALBERT T. MEYERS, *Primary Examiner.*

V. C. CLARKE, *Assistant Examiner.*

U.S. Cl. X.R.

260—247.2, 247.7, 294.7, 473, 519, 559; 424—248, 267, 319, 324